Figure 1:
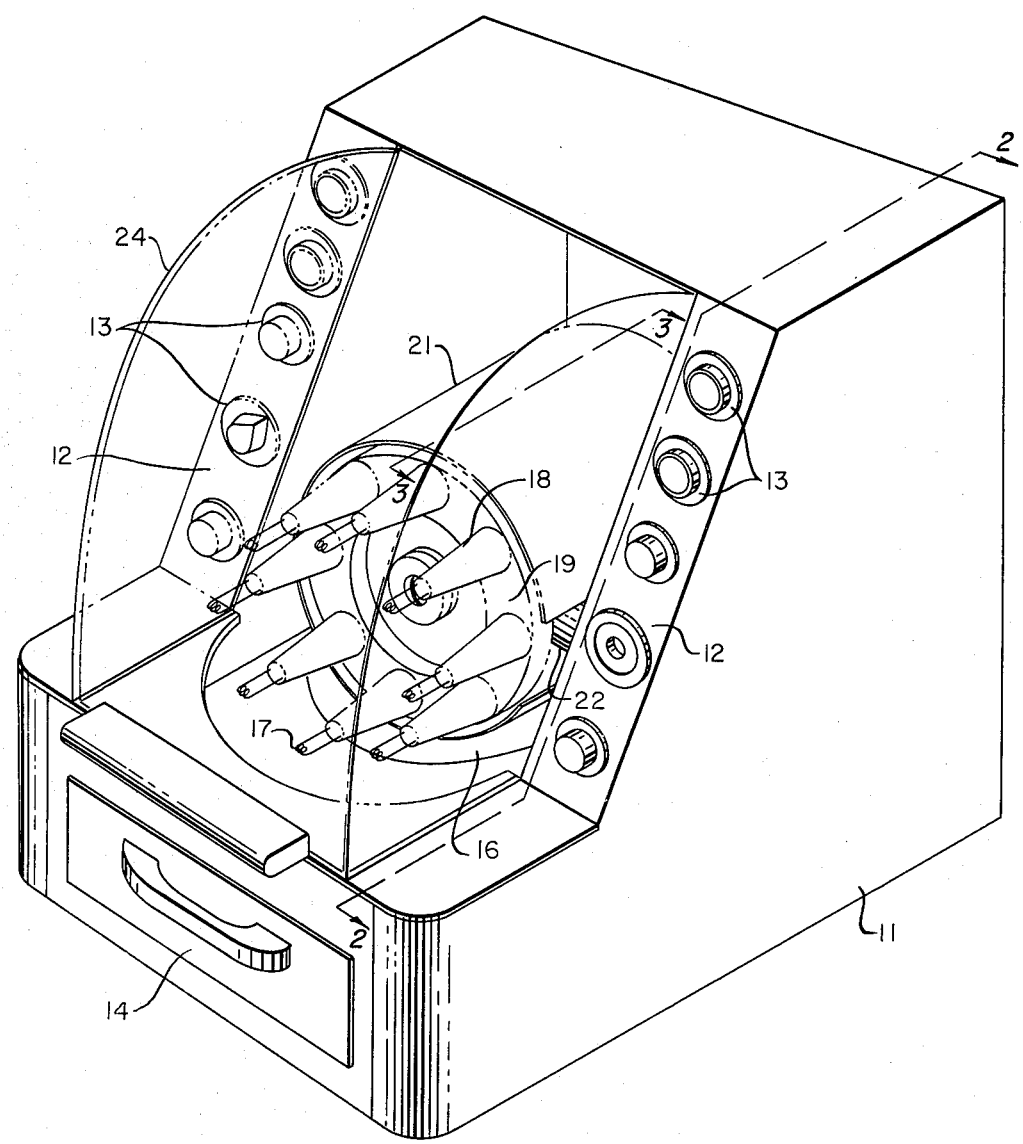

INVENTOR.
EDVARD M. PEDERSEN

March 1, 1966 E. M. PEDERSEN 3,238,115
SEMIAUTOMATIC PROGRAMMED APPARATUS
Original Filed April 17, 1961 3 Sheets-Sheet 2

INVENTOR.
EDVARD M. PEDERSEN
BY
Flehr and Swain
ATTORNEYS

March 1, 1966 E. M. PEDERSEN 3,238,115
SEMIAUTOMATIC PROGRAMMED APPARATUS
Original Filed April 17, 1961 3 Sheets-Sheet 3

INVENTOR.
EDVARD M. PEDERSEN
BY
ATTORNEYS

United States Patent Office 3,238,115
Patented Mar. 1, 1966

3,238,115
SEMIAUTOMATIC PROGRAMMED APPARATUS
Edvard M. Pedersen, Palo Alto, Calif., assignor to Beckman Instruments, Inc., a corporation of California
Continuation of application Ser. No. 103,271, Apr. 17, 1961. This application Feb. 15, 1965, Ser. No. 436,714
11 Claims. (Cl. 204—300)

This invention relates generally to a semiautomatic programmed apparatus and more particularly to such apparatus suitable for use in the determination of protein bound iodine and is a continuation of copending application Serial No. 103,271, now abandoned, filed April 17, 1961.

In copending application Serial No. 28,710, now U.S. Patent No. 3,168,377, filed May 12, 1960, there is described a novel method for the determination of protein bound iodine. The method described includes the steps of drying the sample to form a gel, removing the inorganic iodine from the gel by electrophoresis, placing the gel in a closed vessel containing an atomsphere of oxygen in an amount sufficient to burn all the protein and an absorbing liquid, combusting the gel to form combustion products, absorbing the combustion products in a liquid to form a solution, and determining the amount of inorganic iodine in the solution to thereby give an indication of the protein bound iodine.

In said copending application, a sample to be analyzed is applied to a coiled filament. Electric current is passed through the filament to dry the sample and form a gel. The filament including the gel is then placed in an electrophoretic bath and the inorganic iodine is removed by electrophoresis and electrolytic action. The gel is then heated to dryness and placed in a vessel containing enough oxygen to oxidize the protein and some water. The sample is combusted by transfer of energy to the same as, for example, by passing heavy electric current through the filament. The combustion products are absorbed in the water. The water solution is then analyzed as, for example, by determining its catalytic action to give a measure of the protein bound iodine in the original sample.

The various steps described are performed manually. Certain of the steps are critical. It is preferable that these steps be carried out automatically whereby conditions are duplicated from one test to the next. Furthermore, it is desirable to be able to analyze a plurality of samples simultaneously.

It is a general object of the present invention to provide a semiautomatic programmed apparatus for electrochemical determinations.

It is another object of the present invention to provide a semiautomatic programmed apparatus suitable for automatically performing the critical steps in the determination of protein bound iodine.

It is another object of the present invention to provide a semiautomatic programmed apparatus in which a plurality of samples are carried for analysis on a rotatable and tiltable head assembly which is cycled for the various steps in a determination.

It is a further object of the present invention to provide a semiautomatic programmed apparatus for determining protein bound iodine in which the sample is carried by a plurality of coiled filaments mounted on a tiltable rotatable head assembly. The coiled wires are adapted to be connected to a source of energy for drying and combusting the sample. The head is tiltable for carrying out an electrophoresis operation and tiltable and rotatable for absorbing the combustion products.

These and other objects of the invention will become more clearly apparent from the following description when taken in conjunction with the accompanying drawings.

Figure 2:
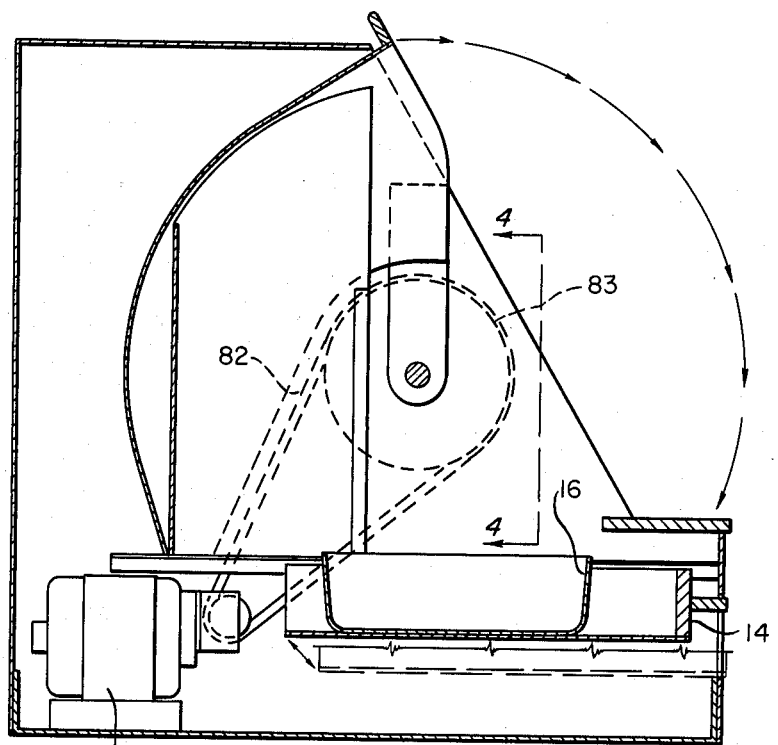
Figures 4, 5:
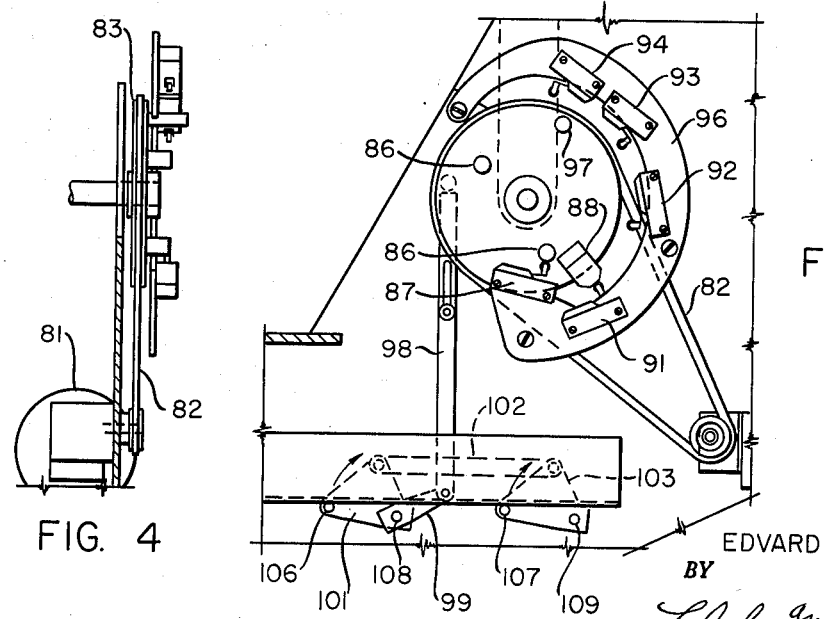
Figure 3:
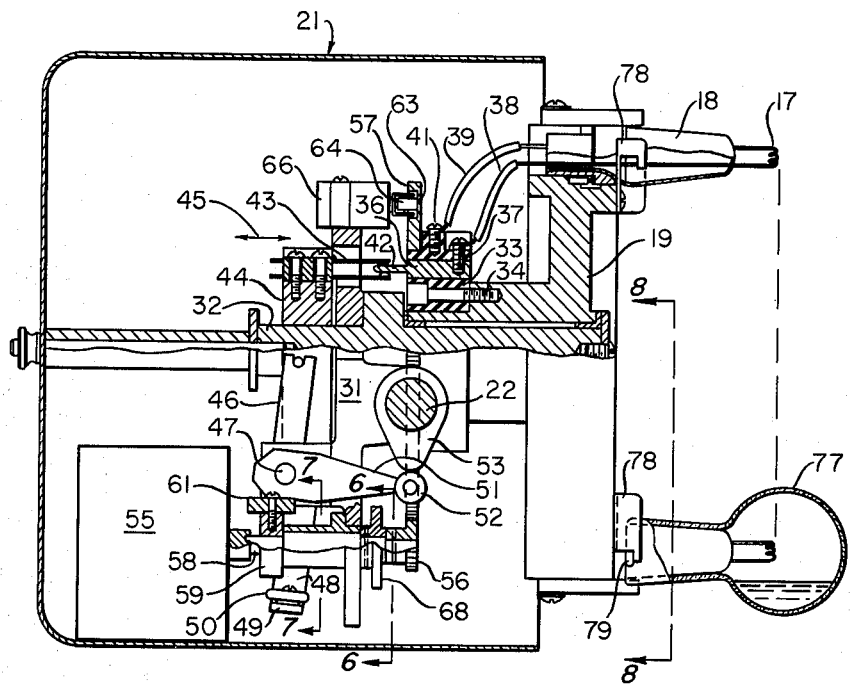
Figure 7:
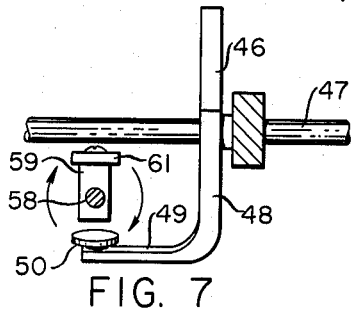
Figure 6:
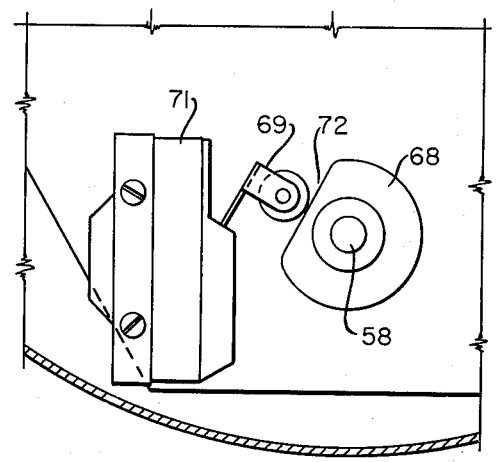
Figure 8:
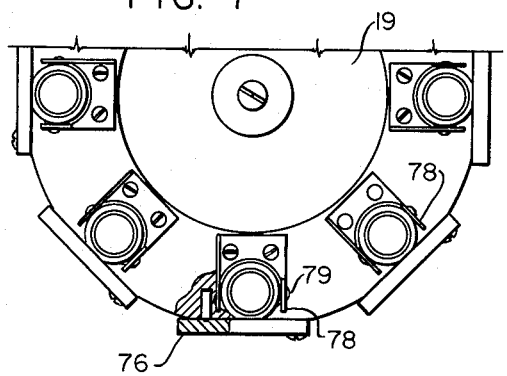

Referring to the drawings:
FIGURE 1 is a perspective view of an apparatus in accordance with the invention;
FIGURE 2 is a sectional view taken along the line 2—2 of FIGURE 1 showing the tilt drive;
FIGURE 3 is a sectional view taken generally along the line 3—3 of FIGURE 1 showing the rotatable head assembly;
FIGURE 4 is a view taken along the line 4—4 of FIGURE 2 showing tilt control switches and mount;
FIGURE 5 is a side elevational view of the tilt control switch and mount;
FIGURE 6 is a view taken along the line 6—6 of FIGURE 3 showing the head rotation control switch;
FIGURE 7 is a view taken along the line 7—7 of FIGURE 3 showing the power disconnect means; and
FIGURE 8 is a view taken along the line 8—8 of FIGURE 3 showing the rotatable head.

Referring to FIGURE 1, the apparatus includes an outer housing 11 which serves to house the various parts of the apparatus. The side walls of the housing are inclined and provided with control panels 12 which mount the control buttons or knobs 13.

The lower portion of the housing is adapted to receive a removable drawer which supports and carries a container 16. The container is adapted to hold deionized water employed during the electrophoresis step of a protein bound iodine determination. The drawer provides means whereby the container can be removed and the water replaced at the end of each run. To prevent cross-contamination, the container 16 may be compartmentalized, or the drawer include means for receiving a plurality of spaced cups adapted to cooperate with the sample holders, to be presently described.

The sample is combusted and dried on suitable electrodes, such as coils 17. These electrodes are supported by terminal leads which, in turn, are supported in spaced relationship by plugs 18 which serve as stoppers for flasks, to be presently described. The plugs 18 are removably carried by a rotatable mounting head 19. The head 19 is rotatably mounted within a housing 21. Means are carried within the housing for intermittently or continuously rotatably driving the head 19.

The complete electrode assembly including the head housing and driving means is tiltably mounted on shafts 22 which, in turn, are mounted on the sides of the main housing 11. The assembly may be tilted so that the electrodes extend vertically downward or may be tilted to any position intermediate horizontal and vertical.

The apparatus preferably includes a tiltable transparent cover 24 adapted to be lifted to expose the electrodes for manually introducing samples, flasks and the like, and closed to protect the sample from the atmosphere and an operator from injury during an operation.

Before proceeding further with the detailed description of the apparatus of FIGURE 1, a brief description of the operating cycle of the instrument for the determination of protein bound iodine is presented. To operate the apparatus, the drawer 14 is opened and clean, deionized water is placed in the container 16. The drawer is then placed back in the apparatus. The filled container is disposed below the head assembly 21.

With the lid closed, relatively high electrical energy is applied individually to the electrodes by means of a selector switch adapted to individually select the electrodes and a button which controls the application of the energy. The application of high energy serves to clean the individual electrodes. It is preferable to apply the high energy to the electrodes individually; otherwise, the relatively high energy involved would require heavy and expensive wiring. During this operation, the various electrodes can be remotely selected. There is, therefore, no necessity for rotation of the head 19.

Subsequently, the lid 24 is lifted whereby the electrodes are exposed and a suitable amount of sample is applied to the coil of each of the electrodes to be retained by the same in accordance with said copending application. A standard sample is preferably applied to one of the electrodes and one other electrode is left blank or uncoated. The lid is then closed.

Next, the apparatus is automatically cycled for the electrophoresis operation by depressing a control. During this operation, relatively low electric power is applied simultaneously to the various electrodes to evaporate moisture off of the sample and dry the sample. When the sample is dry, the complete assembly 21 is tilted downwards whereby the electrodes extend into the deionized water. A direct current is then applied between the electrodes and the container 16 to thereby give a timed electrophoresis cycle whereby the unbound iodine is electrophoretically removed. The head then tilts upwardly to a position in which the axis is approximately 45° with respect to the horizontal. Low power electric energy is again applied simultaneously to the various heads to dry the same. Upon completion of the programmed cycle, an indicator shows that the cycle is completed and that the operator can continue with the next portion of the cycle.

The operator then lifts the lid, fills flasks, which have been partly filled with water, with oxygen which may be available at the apparatus as will be presently described, and then places the filled flasks one over each of the electrodes with the flask being locked in place.

To present the various electrodes sequentially to the same position, a suitable electrical "jog" button is provided whereby the mechanism for rotating the head 19 is energized for a period of time sufficient to index the next electrode for the operator. This cycle is repeated until the requisite number of flasks have been filled and applied to the stoppers and affixed thereto.

The lid is then closed. The operator then energizes each of the electrodes individually with relatively high energy to "flash" or burn the remaining sample. The electrodes are individually flashed in order to reduce the power which might be required if the electrodes were simultaneously flashed.

The next semiautomatic cycle is the absorption cycle in which a timed absorption of the combustion products takes place. During this operation, heat is continuously applied to the electrodes at a relatively low power to prevent any condensation of vapor on the electrodes.

Then the head assembly 21 is tilted up and down between predetermined angles or positions while simultaneously the head 19 is rotated and tilted whereby there is a swirling action to wash the inside surfaces of the flask. Upon completion of this timed cycle, an indicator lights to inform the operator that this portion of the operation is completed. Subsequently, the various flasks may be removed and the amount of protein bound iodine or other material determined by a determination of the iodine in the water.

Referring to FIGURE 3, there is shown a sectional view of the head assembly 21. The head assembly is tiltably carried by a mounting bracket 31 journalled on shaft 22. The bracket 31 carries the shaft 32 which rotatably supports the head 19.

A ring 33 made of insulating material is secured to the head 19 as, for example, by means of spaced screws 34. The ring 33 accommodates a plurality of spaced contact members 36 which are held by contact screws 37. The screws also provide connection to the lead 38 which extends to and is connected to one of the leads of the coiled elements 17 carried by the plug 18.

The other lead extends outwardly and is connected by means of wire 39 to a screw 41 which may be grounded to the apparatus. The contact 36 has a protruding portion 42 which is adapted to ride between the contact tabs 43. The contact tabs are mounted on member 44 which is slidably received on one end of the shaft 32. The member 44 may be moved in the directions indicated by the arrows 45 to bring the tabs 43 into contact with the protruding portion 42.

The member 44 is driven by an arm 46 which is pivoted at 47. The arm 46 has a downwardly extending portion 48 which is bent outwardly as indicated at 49. FIGURE 7. The arm carries an actuating roller 50. An arm 51 which carries a roller 52 is connected to the shaft 47. The roller cooperates with a cam 53 carried by the cover. The cam 53 is shown in the position attained with the cover lifted whereby the roller 52 is urged downwardly to rotate the arms 46 and 51 and slide the member 44 to the right as viewed in the figure to make contact between the tabs 43 and the finger 42. When the cover is closed, the cam 53 will be rotated clockwise.

The head 19 is driven by a motor 55 through drive gear 56 which cooperates with gear 57. The shaft 58 which carries the gear 56 also carries an arm 59 provided with a roller 61, FIGURES 3 and 7. Rotation of the shaft brings the roller 61 into engagement with the roller 50 and rotates the arm 46 counter-clockwise to move the contact tabs 43 out of engagement. Thus, a predetermined time after the head starts to rotate, the electrical connection is broken. The protruding portions are free to rotate without being wiped by the tabs.

The drive gear 57 is notched at 63 and cooperates with the activating arm 64 of a switch 66. The switch 66 may be connected to the control circuit whereby the head 19 may be always indexed to the same starting position.

In the example illustrated, the head 19 is adapted to carry eight electrodes. It is desirable to provide means for indexing the head 19 forward one-eighth of a revolution and then stopping the same for loading or other similar operations. For this purpose, the shaft 58 carries a cam 68, FIGURES 3 and 6, which is adapted to rotate therewith. The cam 68 activates the arm 69 of switch 71. With the selection of a proper gear ratio between the gears 56 and 57, one revolution of the shaft 58 will correspond to one-eighth revolution of the head member. Thus, one revolution of the cam 68 will activate the switch.

The electrical circuits may be provided with disabling means whereby the switch 71 may be disabled to permit the rotary head 19 to continuously rotate.

The electrodes previously described include a plug portion 18 which is received in equally spaced slots formed in the periphery of the rotatable head 19 as illustrated in FIGURE 8 and locked therein by means of a locking latch 76 associated with each position. The plug portions 18 are adapted to receive a flask 77, FIGURE 3. The vessel may be provided with ears 79, FIGURE 8, which are adapted to lock with the locking members 78. Thus, the flasks 77 are easily inserted and removed from the assembly as desired.

In summary then, there is provided a head assembly on which a plurality of electrodes may be mounted on a rotatable head 19. The electrodes are so constructed as to readily receive associated flasks or vessels 77 for carrying out a determination. The head may be continuously rotated, intermittently rotated through a predetermined angular displacement, and is automatically indexed so that it achieves a predetermined starting position. The rotatable head includes means for automatically disconnecting the electrical circuit upon the commencement of rotation of the head assembly and for making the electrical connection as the cover is lifted.

The head assembly is mounted for tilting movement within the housing as previously described. FIGURE 2 is a side elevational view of the housing showing the various parts previously described. Motive means 81 are disposed within the housing and drive the head assembly for tilting movement. The drive means includes positive drive belt 82 cooperating with a pulley 83 connected to tilt the head assembly 21.

The pulley 83 is provided on one face with spaced limit pins 86 which cooperate with a limit switch 87 to limit rotation of the pulley and tilting motion of the head assembly in either direction.

The pulley also carries a cam member 88 which is adapted to cooperate with and activate the spaced switches 91, 92, 93 and 94 carried by the stationary member 96 mounted on the housing. Each of these switches is, in turn, connected to an electrical circuit to control the tilting movement. The circuit may control the tilting movement so that the head may be tilted to any position corresponding to the switches or oscillated between any two switches.

The pulley also carries a drive pin 97 which is adapted to engage and urge the link 98 downwardly. The link 98 serves to drive the crank arm 99 which, in turn, rocks the member 101. The member 101 is linked by link 102 to a similar member 103 which is simultaneously rocked. The members 101 and 103 carry pins 106 and 107, respectively, which engage the bottom of the drawer to lift the same whereby the container 16 is lifted to immerse the coils when the head is in the vertical position. A duplicate assembly of rocking members 101 and 103 (not shown) is disposed on the opposite side of the apparatus and is driven through the shafts 108 and 109.

Thus, there is provided an apparatus which can be programmed to carry out certain operations automatically and which can be manually controlled for other operations. The apparatus is suited for performing certain operations required in the determination of protein bound iodine.

I claim:

1. Apparatus for analyzing chemical composition comprising: a head assembly having a plurality of sample holding means disposed radially about an axis of rotation; means for rotating said head assembly about said axis; means for tilting the axis of rotation between substantially horizontal and vertical positions; means for immersing said sample holding means in an electrophoretic treating tank in the vertical position; means for imposing a direct electrophoresis current between the sample holding means and the tank; means for passing a first treating current through said sample holding means; means for passing a second sample treating higher current through said sample holding means; a pair of spaced electrical leads for supporting each of said sample holding means; and insulating means for supporting said electrical leads in spaced relationship and for supporting product collection means.

2. Apparatus as defined in claim 1 including stationary means adjacent the path of rotation of said leads for making electrical connection to said leads; and means for moving said stationary means away from said path so that said head may rotate without making electrical connections to said leads.

3. Apparatus as defined in claim 2 including means for lifting said treating tank to embrace said sample holding means, when said axis of rotation is in a generally vertical position.

4. Apparatus for analyzing chemical composition comprising: a head assembly having a plurality of sample holding means; means for tilting said head between a first and a second position; means for immersing said sample holding means in an electrophoretic treating tank in the second position; means for imposing a direct electrophoresis current between the sample holding means and the tank; means for passing a first treating current through said sample holding means; means for passing a second sample treating higher current through said sample holding means; a pair of spaced electrical leads for supporting each of said sample holding means; and insulating means for supporting said electrical leads in spaced relationship.

5. Apparatus as defined in claim 4 including stationary means adjacent said leads for making electrical connection to said leads; and means for moving said stationary means so that said head may move without making electrical connections to said leads.

6. Apparatus as defined in claim 5 including means for lifting said treating tank to embrace said sample holding means, when said head is in the second position.

7. Apparatus for analyzing chemical compositions comprising: a head assembly having a plurality of sample holding means; a pair of spaced electrical leads for supporting each of said sample holding means from said head; means for tilting said head between first and second positions; means for immersing said sample holding means in an electrophoretic bath when the head is in said second position; and means for passing a direct electrophoresis current from said sample holding means through said bath.

8. Apparatus as defined in claim 7 including means for passing a treating current via said spaced electrical leads through said sample holding means.

9. Apparatus of the character described including a head assembly comprising a plurality of sample holding means each including a sample heating element adapted to hold a sample and heat the same by passage of electric current through said element, a pair of spaced leads serving to support said holding means and serving to supply electrical energy to the same, means for supporting said leads in insulated spaced relationship, a rotatable head serving to support said lead supporting means, means supporting said head for continuous rotation of said elements in a plane about a predetermined axis of rotation, and drive means for selectively stepping or continuously rotating said head; means carrying said head assembly to permit selective tilting of said axis of rotation between a relatively high and a relatively low angle with respect to the horizontal; and motive means for tilting said head assembly.

10. Apparatus of the character described in claim 9 further including power operated means selectively controllable to perform discrete steps of a predetermined method of operating upon sample carried by said electrodes, said power operated means including said drive means and means for tiltably carrying said head assembly, and for tilting said head assembly.

11. Apparatus as defined in claim 10 further including means serving to tilt said axis back and forth between said dispositions during rotation of said head, and a liquid container carried to enclose each of said electrodes whereby liquid in said containers is swirled in same.

References Cited by the Examiner

UNITED STATES PATENTS

| | | | |
|---|---|---|---|
| 864,782 | 9/1907 | Guttman | 204—214 |
| 1,836,066 | 12/1931 | Edison | 204—199 |
| 2,148,552 | 2/1939 | Hannon | 204—214 |
| 2,560,107 | 7/1951 | Hewson | 23—253 |
| 2,653,083 | 9/1953 | Wanzer et al. | 23—253 |
| 2,749,300 | 6/1056 | Thomas | 204—200 |
| 2,843,540 | 7/1958 | Ressler | 204—180 |
| 3,024,184 | 6/1962 | Bowes et al. | 204—300 |
| 3,057,692 | 10/1962 | Vankirk et al. | 23—252 |

FOREIGN PATENTS 1,067,407  10/1959  Germany.

OTHER REFERENCES

Hawk et al.: Practical Physiological Chemistry, 12th ed., 1947, pp. 415–418.

JOHN H. MACK, *Primary Examiner.*